FIG. I

David H. Mooney Jr.,
INVENTOR.

David H. Mooney Jr.,
INVENTOR.

United States Patent Office 3,448,452
Patented June 3, 1969

3,448,452
ANTI-MISSILE MOBILE SEARCH RADAR
David H. Mooney, Jr., Severna Park, Md., assignor to the United States of America as represented by the Secretary of the Army
Filed Aug. 1, 1966, Ser. No. 570,137
Int. Cl. G01s 9/06
U.S. Cl. 343—11       3 Claims

ABSTRACT OF THE DISCLOSURE

Two phase coded coherent type radar units each having post-amplifier beam forming in elevation, mechanical azimuth scanning, and matched filter multiple receivers connected to exchange information. Two antennas per unit are provided back-to-back with switching of the transmitter and the receiver so that half horizon can be scanned.

---

Figure 1:
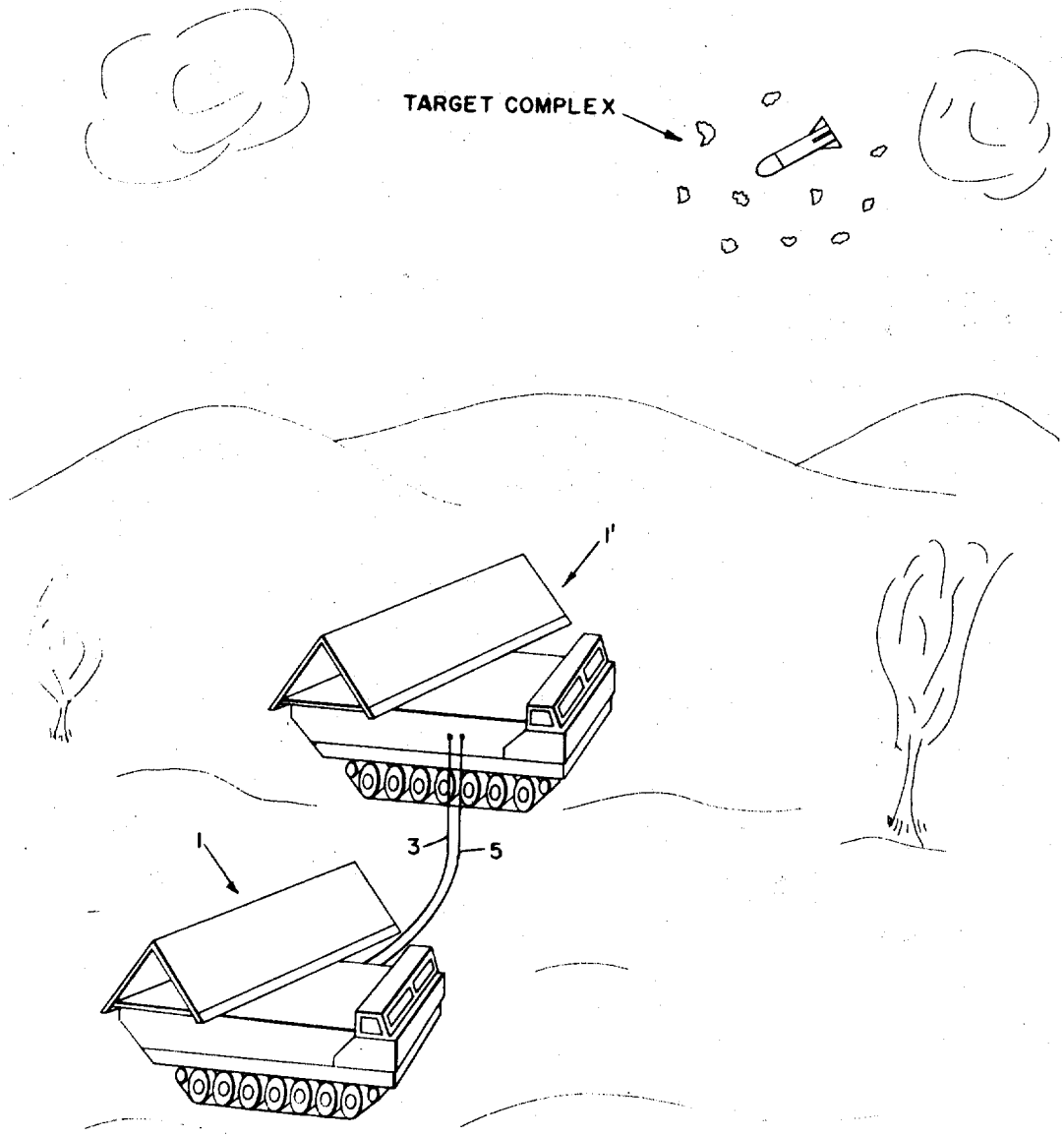

The primary function of a search radar portion of an anti-missile complex is the initial detection of an approaching target complex consisting of the warhead and the accompanying fragments; plus any decoys.

Further, measurement of the target's coordinates must be made and stored so that trajectory analysis and threat verification can be performed by other systems of the anti-missile complex. A search antenna must reduce the number of false alarms due to noise or jamming, determine the presence and extent of a decoy cloud, and provide early warning for troop preparation.

A search radar system to be effective against missiles must have a capability of 360° coverage in azimuth and from +5° to +80° in elevation angle. A shaped detection range versus elevation angle, with maximum range from 20° to 40°, tapered to 65% range at 80° is one of the requirements that has been put on a search radar. Also the search radar must be sufficiently mobile to meet the airlift and Berne tunnel requirements; it must perform in a severe countermeasures environment; and it must have a gradual degradation to provide suitable reliability.

It is therefore an object of the present invention to provide a search radar which will adequately meet the above requirements.

It is, also, an object of the invention to provide two identical search radars which operate as a team.

A further object of the invention is to provide true range data without resorting to PRF switching.

The search radar system consists of two identical units, in separate vehicles, assigned to a single battery as a team. This arrangement provides the highly desirable feature of slow death, since either radar can operate independently, at reduced performance. Hemispherical coverage around the defended area is provided by both units, or by a single unit. At the option of the field commander, a half hemisphere can be covered if desired; again with either one or both units. The smaller angular coverage results in improved range performance, which in certain tactical situations will be useful.

Figure 2:
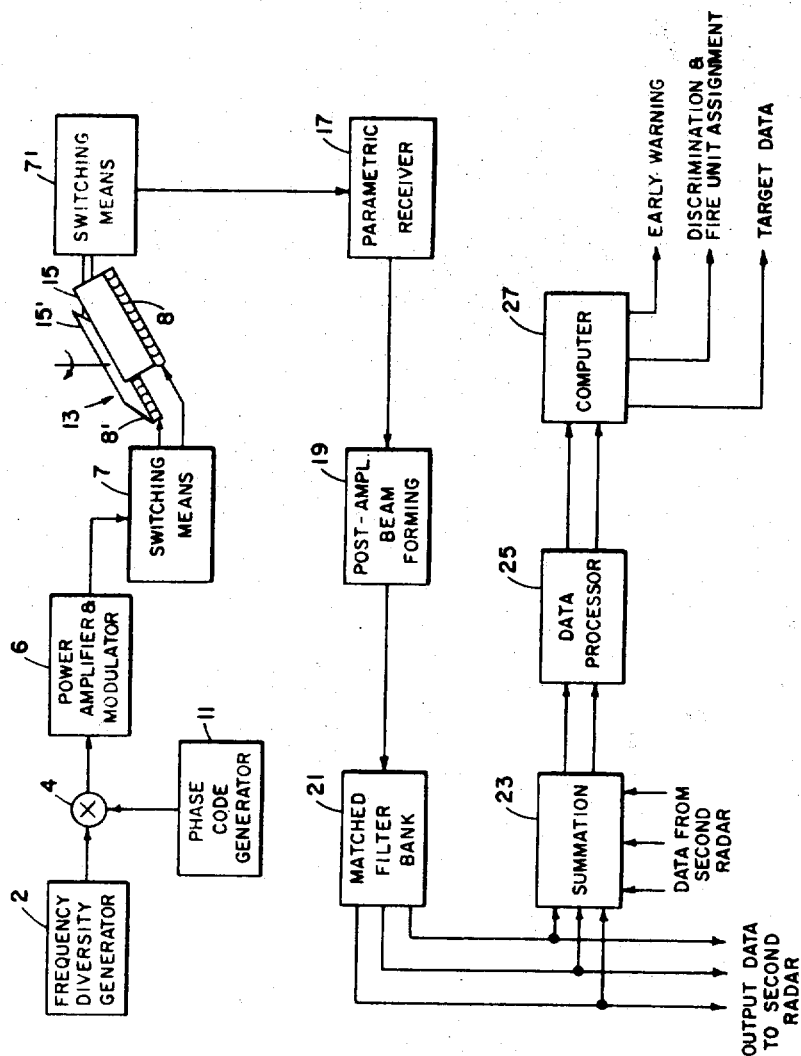

The invention further resides in and is characterized by various novel features of construction, combinations, and arrangements of parts which are pointed out with particularity in the claims annexed to and forming a part of the specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

FIGURE 1 is a diagrammatic representation of a basic concept of the present invention, and FIGURE 2 is a block diagram representation of a system employing an illustrative embodiment of the invention.

The search radar system of this invention normally consists of two identical search radar vehicles 1 and 1' shown in FIGURE 1. These radar vehicles act as a team under normal circumstances. One of the purposes of the two vehicles is to split the total search equipment into two mobile units. When desired, a single vehicle can perform all the search functions with reduced range performance. Although, only two units are shown, any number of units can be coupled by the system shown by Pincoffs in U.S. Patent No. 3,161,870; filed May 6, 1963; and issued Dec. 15, 1964. The prime function of the search radar is to locate the target complex and report this location along with other data to other units in an anti-missile complex, not shown. Since the two radars are identical, operation will be described with reference to only one, except wherein they are tied together.

The search radar system is shown in block diagram in FIGURE 2. The transmitter is a coherent master-oscillator power amplifier type, incorporating a phase-coded pulse compression transmission. In addition, pulse-to-pulse frequency hopping is incorporated: The pulse repetition frequency is kept low enough so that true range is obtained directly, and the pulse width is sufficiently great so that Doppler can be obtained from a single pulse return. Referring to FIGURE 2 the transmitter consists of a frequency diversity generator 2 feeding one input of a mixer 4. Frequency diversity generator 2 has the primary function of generating the R.F. Generator 2 also switches between two frequencies so as to alternate them on transmitting. The output of the mixer is sent through a power amplifier and modulator 6 to the switching means 7. Switching means 7 will selectively connect the output from modulator 6 to either transmitting antenna array 8 of 8'. A phase code generator 11 mixes with the R.F. so as to provide the proper phase relationship to the antennas. A fan beam will be transmitted having its thin dimension in azimuth. The arrays 8 and 8' are positioned in the horizontal plane. For practical purposes the beam extends only from 5° to 80° in elevation angles. This is the area of practical military importance in a search radar.

Antenna 13 consists of two back-to-back multi-beam array antennas. Each has a transmit array and a receive array. The reason for selecting the practical antenna used is its superior compact folding and R.F. properties. The antenna is mechanically scanned in azimuth and is provided with switching mechanism 7 and 7' whereby the input to the transmitting antennas 8 and 8' is alternated every 180° of azimuth scanned. By this, 180° of the horizon may be scanned without the need of oscillating the antenna or of having the scan time be discontinuous. If whole horizon scan is desired, the switching means can be set by the operator to only feed one antenna. The receiving array is mounted in such a way that its normal is inclined at an elevation angle of approximately 20 degrees. This allows the array's broadside direction to coincide with a desired maximum region of the curve of lock-on range as a function of elevation angle.

Post amplifier beam forming techniques are employed in the elevation plane in order to synthesize a number of overlapping high gain pencil beams stacked in this plane. There will be 87 vertically stacked beams. Each pencil beam has its own receiver channel (only one channel is shown in FIGURE 2 for clarity). In this way simultaneous examination can be had of all targets which are at the same azimuth. The parametric receiver 17 feeds a post-amplification beam forming a element 19 which has an output that is fed to a delay-line matrix type of matched filter bank 21. Bank 21 is a range gate filter bank which contains 145 bins. This gives 12,615 lines for all 87 of the receiver channels. Outputs from the matrix will indicate the range by the time of occurrence and the true velocity by the output wire which the signal occurs. By the use of parallel receiver channels, all elevation angles can be observed simultaneously. Each channel performs an identical function, which includes low-noise amplification, post-amplifier forming of the pencil beams, and signal processing with a matched filter bank. The matched filter serves to decode the pulse compressed signal, and is also in the form of a filter bank, whose outputs indicate target Doppler frequency.

A summation device 23 is provided so as to receive the data via a wire link 3, 5, as shown in FIGURE 1, to the second radar unit, which is mounted on another vehicle. The summation unit will noncoherently sum the signals by the method of aperture adding disclosed by Mr. Pincoffs in U.S. Patent No. 3,161,870. A data processor 25 accepts detected radar signals from the receiver on any one of the 12,615 lines which specify the elevation and range rate of the echo. Range and azimuth are established by the time of arrival of the signal relative to the timing references generated. Data processor 25 digitizes the range rate, elevation angle, range, and azimuth of the incoming signals. The digitized information is then correlated on a sweep-to-sweep basis so as to reduce the high input false alarm rate to a suitable low level. Signals which correlate (i.e. match in all three spatial dimensions plus range rate) are formed into digital words and fed to the computer 27 upon command.

Computer 27 is the center of intelligence of the anti-missile complex. It is located in the search radar vehicle with the search radar data processor and performs the vital functions of track-while-scan, threat evaluation and fire control unit assignment. In the track-while-scan function, the computer establishes a file of information of "track" on each target in the field of view of the search radar. New returns from the search radar data processor are used to update these files during each radar scan period, thereby maintaining the track. Random noise which, through chance, satisfies the detection criteria of the search radar data processor is discarded because of failure to correlate on a frame-to-frame basis. The computer provides early warning, discrimination and fire unit assignments, and target data signal output to other systems in the anti-missile complex, not shown.

A preferred embodiment of the invention has been chosen for purposes of illustration and description. The preferred embodiment illustrated is not intended to be exhaustive nor to limit the invention to the precise form disclosed. Accordingly, it is desired that the scope of the invention be limited only by the appended claims.

I claim:

1. A system having at least two identical radar units, each unit comprising transmitter means for transmitting a fan shaped radiation pattern in a vertical direction, receiver means, beam forming means connected to said receiver means for forming a number of pencil beams stacked in a vertical plane, processing means connected to said beam forming means for processing any signal information received, switching means capable of being set for sequentially connecting and disconnecting the antennas to the power generating means such that the system may scan 360° or less, as desired, said transmitter means comprising a power generating means connected to said switching means, a plurality of antennas rotatable in a horizontal plane, said switching means being connected to said plurality of antennas such that only one antenna will be connected to the power generating means at any given time, and said processing means of each and every radar unit in the sytsem interconnected for transferring target data between respective units.

2. A system as set forth in claim 1, further comprising a plurality of mobile vehicles, and said radar units being mounted on said mobile vehicles.

3. A system as set forth in claim 2, wherein each radar unit is so controlled that it can operate independently of all other radar unit.

References Cited

UNITED STATES PATENTS

| | | | |
|---|---|---|---|
| 2,514,617 | 7/1950 | Albersheim | 343—10 |
| 3,064,252 | 11/1962 | Varela | 343—11 X |
| 3,126,172 | 3/1964 | Parkinson et al. | 244—3.13 |
| 3,161,870 | 12/1964 | Pincoffs | 343—5 |
| 3,274,592 | 9/1966 | Crane | 343—11 |
| 3,308,456 | 3/1967 | Levenson et al. | 343—5 |

RODNEY D. BENNETT, JR., *Primary Examiner.*

M. F. HUBLER, *Assistant Examiner.*